United States Patent [19]

Réynier

[11] 4,163,144
[45] Jul. 31, 1979

[54] HEATED DOORS

[75] Inventor: Jacques A. Réynier, Limoges, France

[73] Assignee: Elmetherm, Saint-Auvent, France

[21] Appl. No.: 679,697

[22] Filed: Apr. 23, 1976

[30] Foreign Application Priority Data

Apr. 25, 1975 [FR] France .................................. 75 12924
Dec. 31, 1975 [FR] France .................................. 75 40204

[51] Int. Cl.² ........................... E06B 5/00; F24H 9/08
[52] U.S. Cl. ........................................ 219/368; 49/70;
98/87; 219/213; 219/347; 219/363; 219/364;
219/367; 219/522
[58] Field of Search ............... 49/70; 160/127; 165/47,
165/48, 57, 86, 73, 128, 129; 62/263; 219/201,
213, 342, 343, 359, 363, 364, 365, 366, 367, 368,
369, 370, 374, 375, 376, 522; 98/87

[56] References Cited

U.S. PATENT DOCUMENTS

| 507,941 | 10/1893 | Snee | 219/376 |
|---|---|---|---|
| 1,798,892 | 3/1931 | Murray, Jr. | 49/70 |
| 1,848,716 | 3/1932 | Hart et al. | 219/376 |
| 1,978,413 | 10/1934 | Child | 219/368 |
| 2,530,806 | 11/1950 | Boxrud | 219/375 |
| 2,849,589 | 8/1958 | Lancaster | 219/368 |
| 2,988,626 | 6/1961 | Buttner | 219/213 |
| 3,057,989 | 10/1962 | Needham | 219/213 |
| 3,211,899 | 10/1965 | McEachron | 219/363 |
| 3,539,767 | 11/1970 | Eisler | 219/528 |
| 3,564,201 | 2/1971 | Jones et al. | 219/374 |

FOREIGN PATENT DOCUMENTS

| 975415 | 9/1975 | Canada | 219/213 |
|---|---|---|---|
| 2337230 | 1/1975 | Fed. Rep. of Germany | 49/70 |
| 14848 | of 1887 | United Kingdom | 98/87 |
| 414475 | 8/1934 | United Kingdom | 219/342 |
| 878838 | 10/1961 | United Kingdom | 98/87 |
| 884296 | 12/1961 | United Kingdom | 219/213 |
| 1240642 | 7/1971 | United Kingdom | 219/366 |

OTHER PUBLICATIONS

Brochure "Grilles Resistantes ou Toiles Chauffantes" French.

Primary Examiner—E. A. Goldberg
Assistant Examiner—Bernard Roskoski
Attorney, Agent, or Firm—Brisebois & Kruger

[57] ABSTRACT

A heated door is formed by two wooden face panels rendered fire-resistant, which are spaced apart by laths which define flues at the base of which are arranged one or more electrical heating elements. Openings are formed in the upper part and the lower part of each of the two face panels and into them are fitted deflectors or they are blocked by covers which are connected to the deflectors by screws. Arrangements are made for supplying power to and regulating the door and making it safe to use.

This type of door is usable in dwelling or work spaces.

15 Claims, 10 Drawing Figures

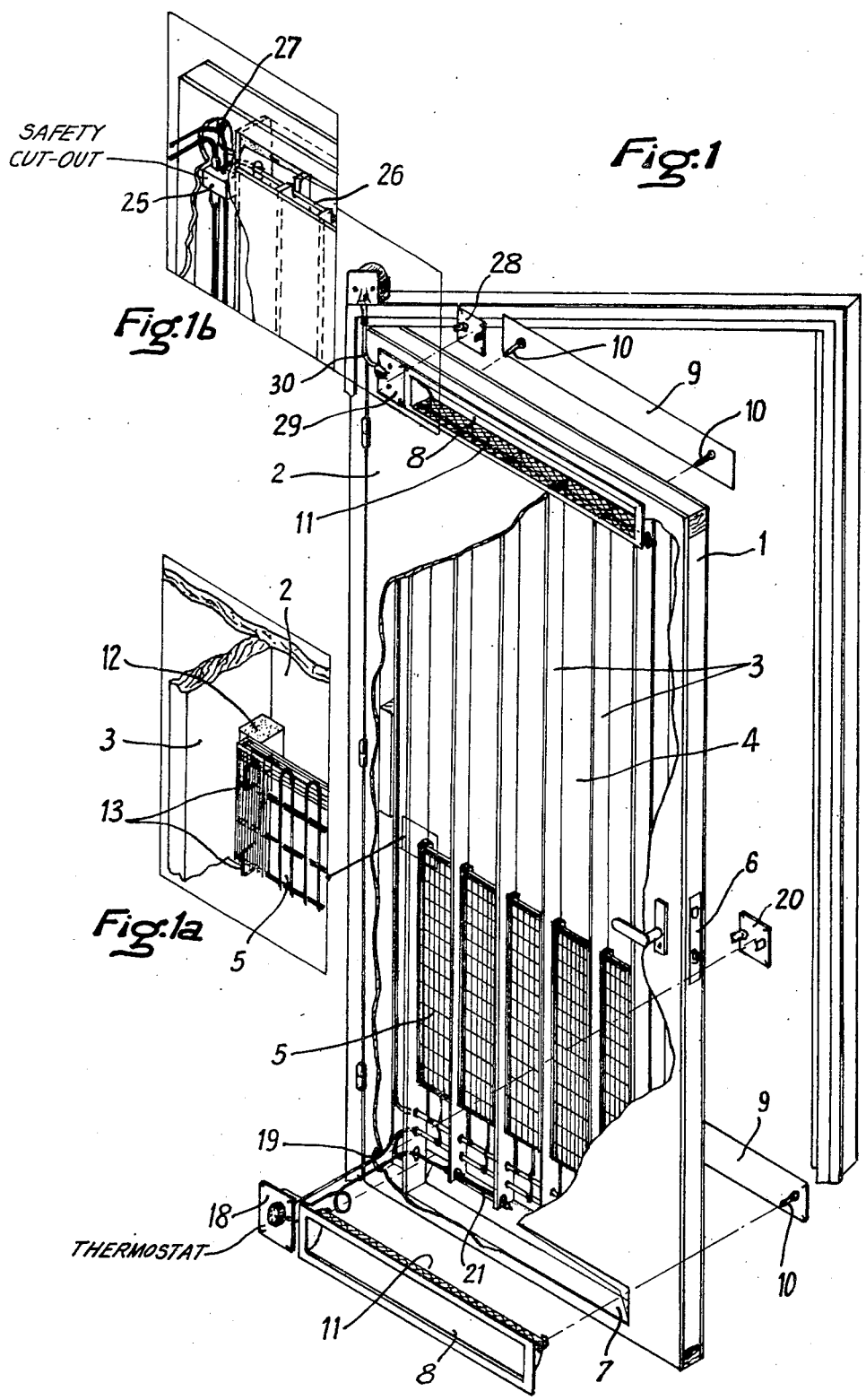

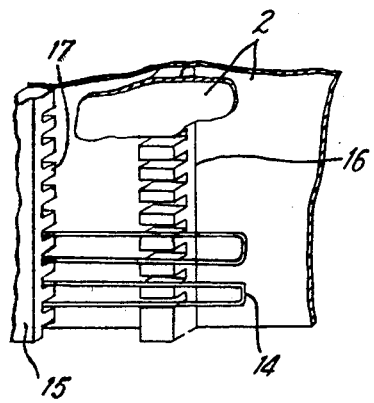
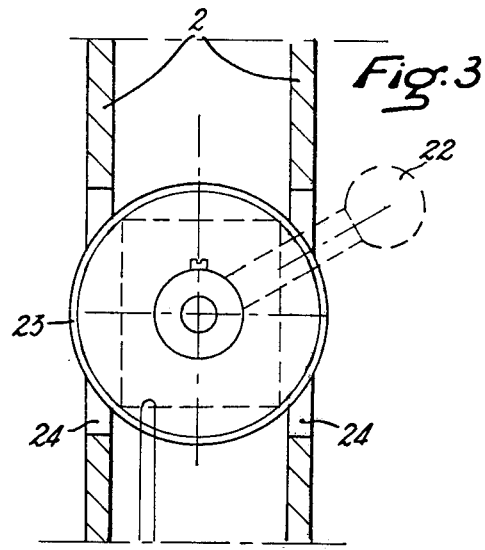
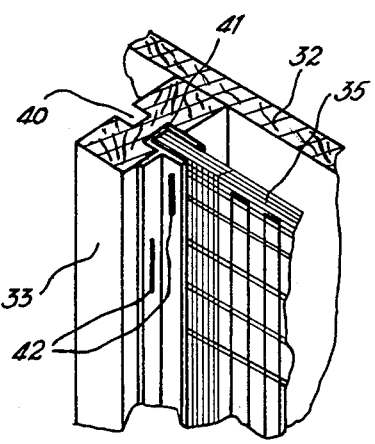

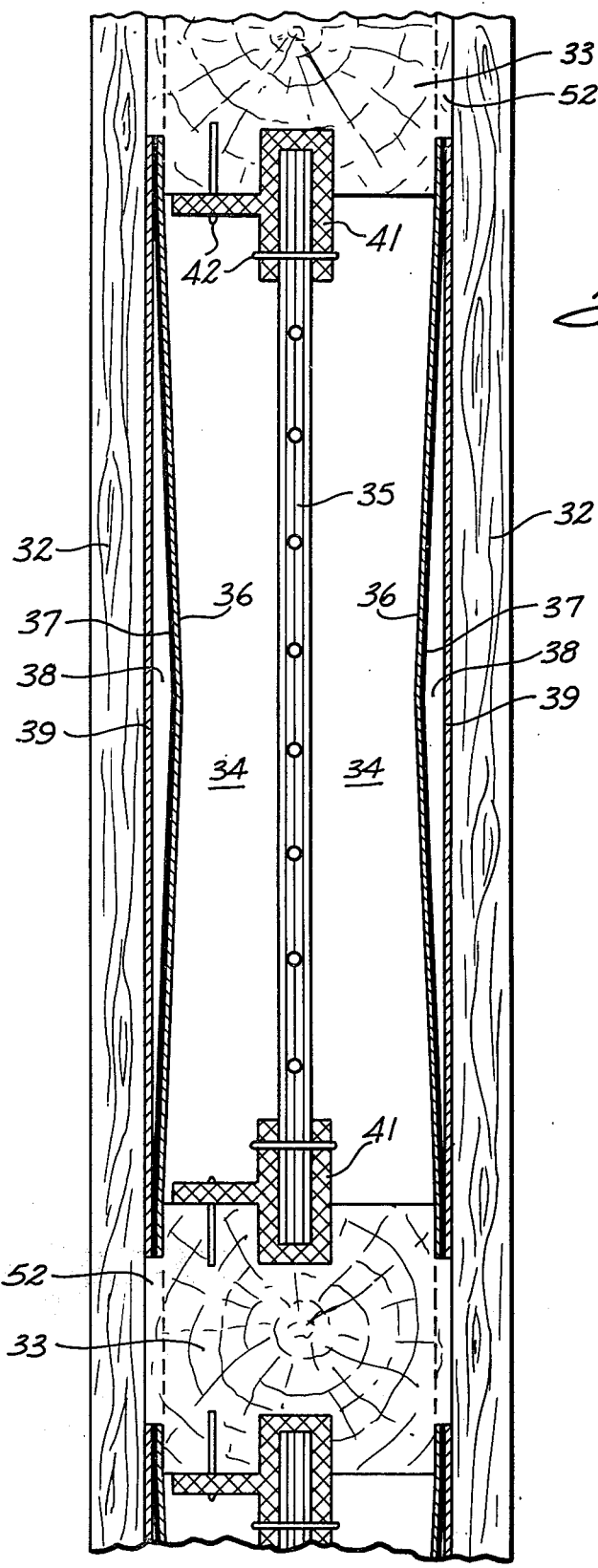

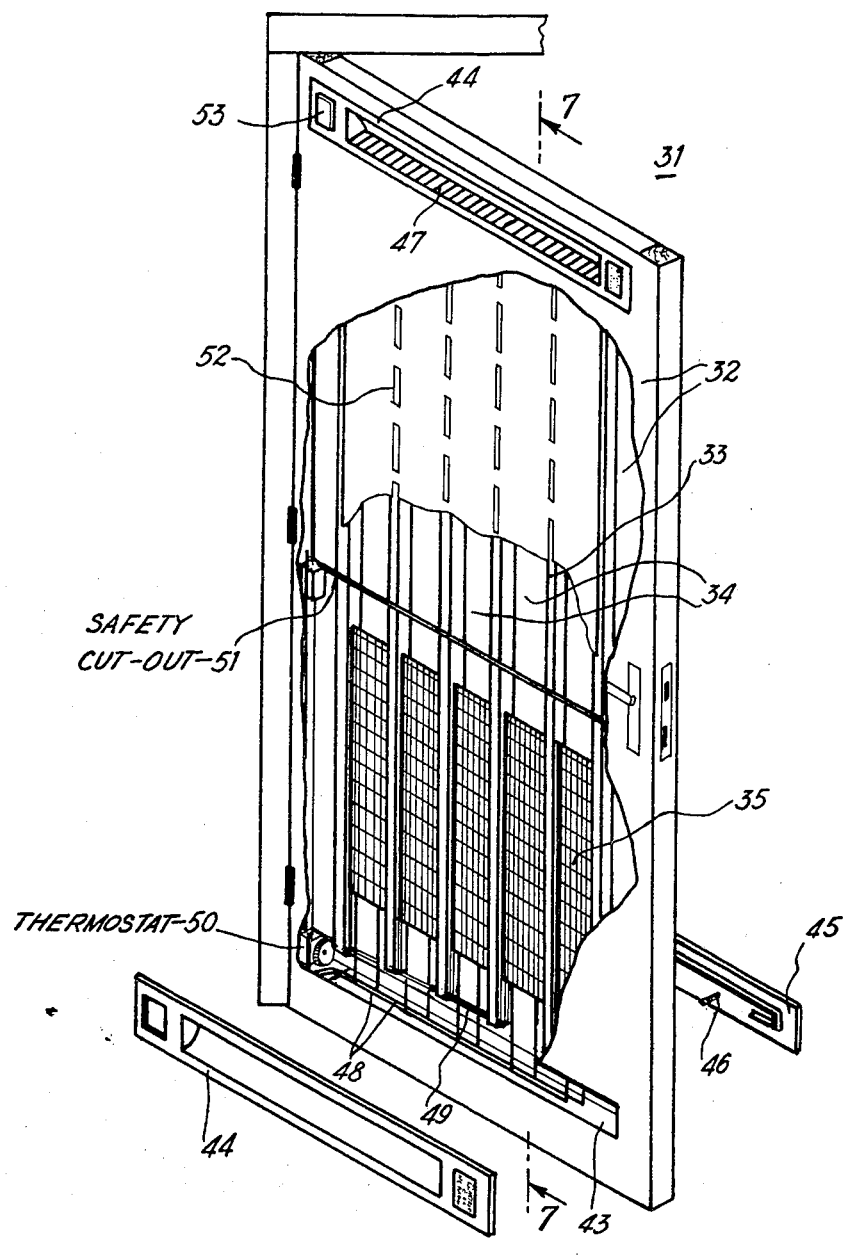
Fig:6

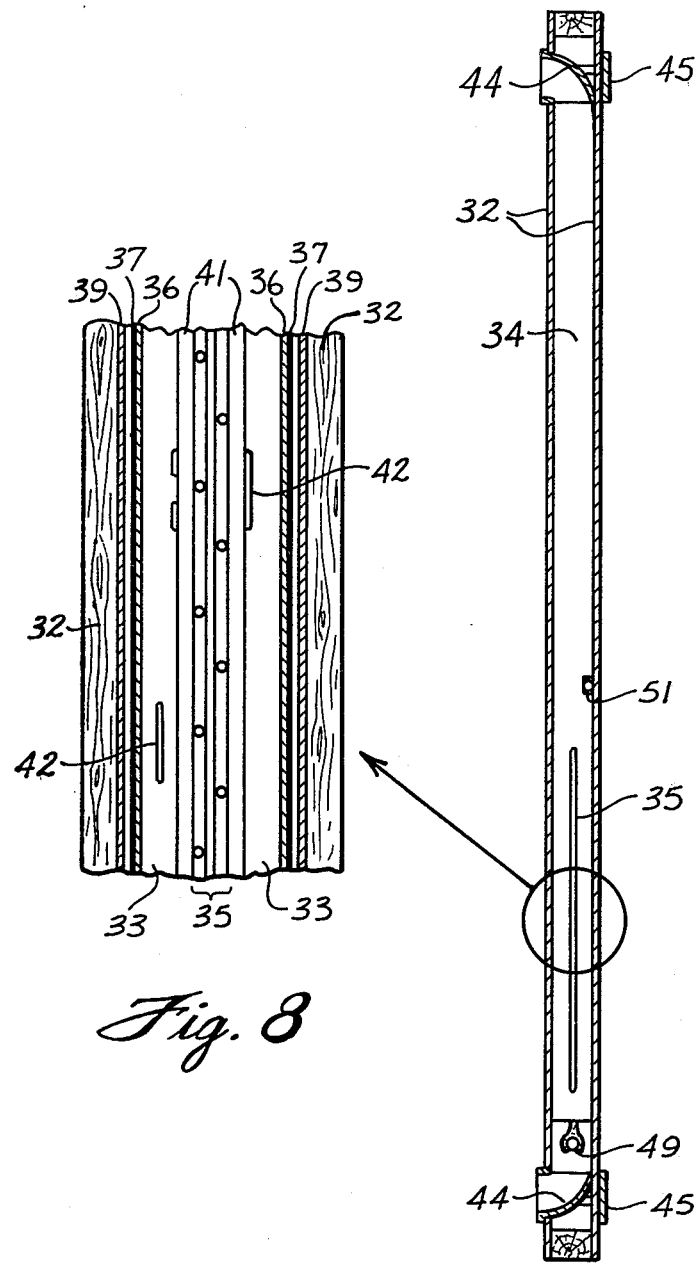

HEATED DOORS

BACKGROUND OF THE INVENTION

The present invention relates to heated doors, having two face panels which are rendered fire resistant.

Various proposals have hitherto been made for heating buildings.

For example it has been proposed to provide a door made up of two face panels with a heating element situated half way up the door, this heating element being separated from the said face panels by a cladding, of metal for example, which reflected radiant heat into the interior of the door, fresh air being admitted under the door by means of a slot formed in the lower rail of the door and hot air escaping through an opening made at the top of the door. A door of this kind does not satisfactorily heat the room in which it is located, firstly because there is no heat actually radiated from the door, and secondly because of the nature of the air circuit, which prevents the heating from being uniform and which also makes it necessary for a gap to be left under the door, which is often undesirable.

It has also been proposed to provide a somewhat similar heated door, in which air was likewise admitted through a slot formed in the lower cross rail of the door, but in which the hot air was expelled through a slot formed in the upper rail thereof. Once again, a door of this kind does not provide a satisfactory solution to the problem of heating a locality by means of a door.

It is an object of the invention to provide a heated door which minimizes the above-mentioned disadvantages.

SUMMARY OF THE INVENTION

Accordingly, the invention consists in a door, preferably a so-called flush door, comprising two face panels made from fire-resistant materials, said face panels being spaced apart by vertical laths also made from fire-resistant materials, said laths also supporting at least one electrical heating element situated in the lower part of the door, the distance between said laths not exceeding 150 mm.

The distance between the laths is preferably equal to or less than 100 mm, and the heating element or elements are situated in the lower third of the door.

At least one of the two face panels is provided with openings, preferably two in number, one of which is situated in the lower part of the face panel and the other in its upper part, the said openings being capable of being blocked off, if need be.

In a modified embodiment, both face panels are provided with openings and in this case the openings are situated opposite one another.

In a preferred embodiment, there is inserted, on either side of each heating element and in the immediate vicinity of the face panels of the door, a sheet of a thermal insulating material such as asbestos and preferably extending over the entire height of the door.

Said sheet may be metallized on the side on which the face of the door is situated, thus preventing its being in direct contact with the face panel of the door.

BRIEF DESCRIPTION OF THE DRAWINGS

Other advantages and features of the invention will be better understood from the following description which relates to the accompanying drawings, which are given by way of example only and in which:

FIG. 1 is a schematic view of a door according to the invention, one of the faces being cut away to show the inside of the door, and various component parts of the said door being shown separated from it, FIG. 1a is an enlarged detail of FIG. 1 (showing how the heating elements are fitted), FIG. 1b is another enlarged detail of FIG. 1 (showing the position of the safety cut-out), FIG. 2 shows a modified embodiment of the heating element of the door, FIG. 3 shows one of the thermostats which may be used in the said door, FIG. 4 is a partial view in section taken along line 4—4 of the preferred embodiment of the door shown in FIG. 6, FIG. 5 is an enlarged detail of a portion of FIG. 4, FIG. 6 shows the preferred embodiment of heating door referred to above, FIG. 7 is a view in section taken along line 7—7 of FIG. 1, and FIG. 8 is an enlarged view of the circled portion of FIG. 7.

DETAILED DESCRIPTION OF PREFERRED EMBODIMENTS

Referring now to the drawings, FIG. 1 shows a door, which is referred to in general by reference numeral 1. This door, which is a flush door and may or may not conform to present-day marketing standards, is formed by, inter alia, two face panels 2 and vertical laths 3 which hold the said panels apart. The faces 2 and laths 3 are preferably made from wood or the like, such as panels of reconstituted wood or panels of wood in the form of so-called "fire-proofed" particles. Inside the door the laths 3 define various vertical compartments 4. A heating element 5 is preferably arranged in each of the said compartments, in the lower part thereof.

Various trials were carried out to discover the best position for the electrical heating elements 5. Following the said trials, it was concluded that the best results as regards heating were obtained when the elements 5 were situated in the lower part of the door and preferably in the lower third of the door. In effect, there is a concentration of heat from the heating elements at the base of the door, which leaves the upper part of the door free, each compartment 4 acting as a flue, with the ratio of ⅓ to ⅔ ensuring a good draught for the hot gases. Furthermore, the lower third of the door represents the region below the lock and handle unit 6 and thus, when the said unit is fitted, there is no danger of the heating elements being touched and thus damaged.

To further improve the draught and thus the proper circulation of heat, the laths, which are preferably small in thickness, need to be spaced a certain distance apart, thus defining the width of each of the compartments 4. This distance should be a maximum of 150 mm since if it is greater the door has poor mechanical strength. Preferably, the distance is of the order of 100 mm, which on the one hand enables the door to be of satisfactory strength and on the other hand enables five or six heating elements, or even more, to be fitted as dictated by the width of the door, a compartment 4 of 100 mm width providing a very good draught of hot air and a door of satisfactory strength.

Also evident in FIG. 1 is the presence of openings 7 which are formed in the lower part of each of the two faces 2 of the door. Identical openings, which are thus situated opposite one another, are formed in the upper part of the door. In the Figure, one of the openings is provided with a concave deflector 8 which is arranged between the two faces of the door and whose concavity is directed towards the opening opposite which it is situated. In this instance the other opening is blocked off by means of a plate 9. The same members 8 and 9 are also present in the openings formed in the upper parts of the two faces of the door. A system of spacers, which may in particular be screws 10, enables the deflector and the plate to be connected, and the two faces of the door to be sandwiched between them in this way.

Other arrangements are also possible and in this way all the openings may be provided with concave deflectors, thus dispensing with the detachable plates 9 which completely block one of the openings. Furthermore, the system of spacer screws 10 allows a plate and/or a deflector to be quickly changed in the event of damage being caused to one or other of them and also allows a plate to be replaced by a deflector and vice versa.

In order to prevent foreign bodies making their way between the two faces, a grille 11 is provided in the upper and lower openings, which grille is situated just below the upper openings and just above the lower openings. Preferably, the mesh size of the grilles is small and is less than or equal to 10 mm. In a preferred embodiment, the grilles form an integral part of the deflectors 8, which, if occasion arises, allows the meshes of the said grilles to be cleaned and unclogged when they have become obstructed by foreign bodies, by removing the appropriate deflector 8.

As regards the elements 5 which enable the air flowing against the two face panels of the door to be heated, it has been found that good results are obtained when the said elements are of the "black resistor" kind, which reach a temperature of only about 500° C. (below the red hot temperature), which may or may not be coated with an insulating material and which are in particular formed by interwoven resistance wires and insulating wires.

FIG. 1a shows more clearly the way in which the elements 5 are attached to the laths 3. For this purpose there are used longitudinal strips 12 which are integral with the partitions 3 or are attached to them, and a preferred manner of attaching the elements 5 to the said longitudinal strips 12 is by means of staples 13, the heating elements being positioned at approximately the same distance from both face panels of the door.

The said heating elements 5 are preferably connected in parallel, which, when one resistor goes out of action, makes it unnecessary to change the other elements 5.

FIG. 2 shows another embodiment of the heating elements, which in this case are formed by resistance wires 14. The wires may or may not be coated and they are coiled in a serpentine configuration by means of bars 15 shaped like combs. The bars 15 form spacers between the faces 2 of the door and they are arranged to face alternately in opposite directions, with the result that a face panel 2 is in contact alternately with the base 16 of one bar and the teeth 17 of the next, the object being to improve the mechanical strength of the door.

In FIG. 1 a thermostat 18 is situated in the bottom part of the door. It is fitted into the door through an opening 19 which is situated at the same level as opening 7, so that only the knob of the thermostat 18 projects from face 2. The opening 19 situated opposite is blocked off by means of a cover 20, thus enabling the adjusting knob of the thermostat to be arranged on either side of the door by making the appropriate interchange.

In the present case the sensor 21 of the thermostat 18 is situated in the bottom part of the door, and more particularly below the heating elements 5, that is to say in the area where fresh air is admitted through openings 7. The thermostat is controlled by means of the aforementioned knob. It may also be controlled, in the way shown in FIG. 3, by means of a handle 22, or even by means of a control member 23 which is accessible from both sides of the door, through two slots 24 which are situated facing one another and are formed in the faces 2 of the door. In this latter case the cover 20 is no longer needed.

In addition, the thermostat 18 is connected in series with one or more safety cut-outs which are arranged in the top part of the door.

FIG. 1b shows such a safety cut-out, which is referenced 25. The sensitive part 26 of the cut-out is here shown in the form of a rod and this rod is arranged across the whole width of the door, since the whole of the said width is occupied by heating elements 5. By this means it is possible to avoid the danger of the cut-out not operating if one of the compartments 4 should happen to become blocked for some reason or other. It is understood that it is useful for other safety cut-outs to be positioned in the door in order to increase reliability still further.

Two openings 27 (FIG. 1b), which are situated facing one another at the same level as the upper openings 7, are formed in the faces of the door in order to enable the electrical conductors to be led out from either side of the door. For this reason, on the side of the door from which no electrical conductors are led out, the opening 27 is blocked by means of a plate 28 similar to plate 20, or by means of a plate which incorporates a switch for the circuit in the door, while on the side of the door on which the said conductor is led out there is arranged a known type of plate 29 which allows the said electrical conductor, marked 30, to be led out.

FIGS. 4 to 6 illustrate another embodiment of the heated door, to which various improvements have been made in comparison with the door illustrated in FIGS. 1, 1a and 1b. The purpose of these improvements is in particular to increase the through flow of air and to lower its exit temperature by increasing the effective cross-section of the current of air and by removing obstacles which might retard its flow. It has in fact been noted that, in certain instances, due to the considerable length of the flues, the air, being vigorously heated by contact with the heating element or elements, travels upwards at high speed using only the centre portion of the flues.

Referring to FIG. 4, there is shown a door 31, having face panels 32 for example, made of plywood, these face panels being separated by laths 33 which act as spacers for spacing the face panels apart. The spaces between the laths 33 define flues 34 in which the heating elements 35 are positioned.

To obtain a door of higher performance, there is positioned on either side of the heating elements 35 a sheet of thermal insulating material 36 such as asbestos, the material preferably extending over the entire height of the door.

Preferably this sheet is provided, on the face panel side with a metallized covering 37, a gap 38 being left between face panel 32 and the major part of sheet 36 by bowing the sheet. This bowing arrangement may be the result of the way in which sheet 36 is attached, as shown in FIG. 4, where the sheet is caught or clamped between the laths 33 and the faces 32, and perforations 52 are provided in sheet 36 to enable the laths 33 to be effectively bonded to the said face panels 32.

Preferably also, a thin metal sheet 39 is arranged in the gap 38 and this sheet is so positioned as to prevent its coming into contact, as far as possible, with, metal covering 37, of sheet 36. Sheet 39 is situated in the area where there is a danger of the face panels overheating, namely at least at the upper part of the heating element or elements and the region just above.

The result of taking the above steps is that, because of the radiation from heating element 35, the inserted material 36 reaches a sufficiently high temperature to assist in heating the air, which acquires an upward motion from contact with it.

Thus, far from being retarded by sheet 36, a flow of air is set up over the entire cross-section of flues 34 and its exit temperature is more suitable for heating a dwelling area.

Furthermore, there is provided a safety lead, which is taken to earth, and which is connected to the metal sheets 39, or to the metal covering 37, or to both. The result is that people are quite safe in the event of the face of the door being pierced by a nail or any other object with conducts electricity.

With the same object of improving the flow of air between the faces of the door, the heating elements are attached to the various laths in a modified fashion as compared with FIG. 1, the modification being achieved by dispensing with the attachment strips whose presence within the compartments forming the flues may be disadvantageous, particularly in cases where the heating elements are formed by fabric-like heaters.

FIG. 5 shows this new manner of attachment and it can be seen that the heating elements 35 fit into grooves which are formed in the laths 33 which hold the panels 32 apart. A channel member 41 made of plastics material for example or some other electrically insulating substance is preferably arranged in the grooves 40 of the laths and is attached to the insulated part of the heating elements 35. On the one hand the channel member 41 ensures satisfactory attachment and on the other it represents a double electrical insulation, the attachment being achieved by means of staples 42 for example. Channel member 41 could also be dispensed with and the attachment could be achieved simply by bonding the heating elements into the grooves, in particular by using a silicon-based elastomer.

Other improvements have been made to the heating door illustrated in FIG. 6, but it retains certain of its features and in particular the door 31 still has two faces 33 made of wood or the like, and laths 32 which space the said faces apart and which form flues in which are situated the heating elements 35.

Openings 43 are formed at the top and bottom of each panel 32 and these openings are either partly blocked by deflectors 44 or completely blocked by covers 45. A system of spacer screws connects members 44 and 45.

In the present case the grilles of FIG. 1 are replaced by shaped bars 47 which lie a distance of the order to 10 mm apart, these shaped bars allowing the air to flow aerodynamically.

In contrast to FIG. 1, the conductors 48, of which there are at least two, and which provide a single phase, or possibly a three phase, electrical supply for the heating elements 35, may be formed for example by insulated conductors which are situated below the opening 43 which forms the air intake, rather than above it as was the case in FIG. 1. Consequently, all that remains above the said opening 43 is the sensor 49 of the thermostat 50, which in the present case is controlled by the knurled wheel shown in FIG. 3, which fits into deflector 44. Protection is provided for the conductors 48 in this way since they are out of the flow of air.

Still with the object of improving the flow of air inside the door, the safety cut-out has been shifted from its original position just below the upper deflector. The safety cut-out 51, which is advantageously of the "vapor tension" type, is accommodated away from the central part of the current of hot air in a cut-out formed in the edges of laths 33, against one of the faces 32. Also, it is situated near the top of the heating elements 35, at a distance of less than 200 mm and one preferably between 10 and 50 mm from them, in which area there is the quickest rise in abnormal heat in the event of the entries or exits of the flues 34 becoming blocked. Another cut-out may also be fitted if desired.

What has just been described relates to a conventional two-wire single-phase current supply in which switch 53 and the thermostats break the phase wires directly. However, a three-phase supply may be used if desired, in which case it would be preferable for the three phases of the supply to be broken by a relay which was in turn operated by the switch and the thermostats.

It should be noted that one of the features of the door according to the invention is the interchange-ability of various components. Starting with a door as shown in FIG. 1, within which heating elements are situated, and the faces of which contain for example two openings 7 in their upper parts and two other openings 7 in their lower parts, with openings 19 (FIG. 1) and 27 (FIG. 1b described above) also provided, it is possible to adapt the door to the user's requirements by fitting deflectors and/or cover plates to openings 7, a thermostat and a cover plate (if the thermostat is to be fitted to the door) or two cover plates (if the thermostat is to be sunk in the wall) to openings 19, and a cover plate with or without a switch and a plate enabling the electrical conductors to be led out from openings 27. The same applies to the door illustrated in FIG. 6.

Other modifications within the capacity of the man skilled in the art may be made to the present invention without thereby departing from its scope as defined by the appended claims.

I claim:

1. A heated door comprising, two spaced apart wood face panels, at least one of said panels having a lower fresh air inlet opening and an upper heated air outlet opening; means defining a plurality of chimneys between said face panels and extending along substantially the entire height of said panels, said chimneys comprising, a plurality of upright wood laths extending between the face panels and extending along substantially the entire height of said panels, and means securing the laths to said face panels in spaced apart relation widthwise of the door; the distance between two adjacent laths not exceeding 150 mm; electric heating element means in said chimneys in a lower third of said door for heating air in said chimneys to cause flow from said inlet opening to said outlet opening; and means for supplying electrical energy to said heating element means.

2. A heated door according to claim 1 wherein both said face panels having a fresh air inlet opening and a heated air outlet opening, said inlet openings of the panels being situated opposite one another, and said outlet openings situated opposite one another.

3. A heated door according to claim 2, further comprising a first detachable concave deflector between said face panels, said deflector facing toward one of said inlet openings to deflect air upwardly through said chimneys, a detachable plate blocking the other of said inlet openings, a second detachable concave deflector between said face panels and facing one of said outlet openings, and a second detachable plate blocking the other of said outlet openings.

4. A heated door comprising two spaced apart wood face panels, at least one of said panels having a lower fresh air inlet opening and an upper heated air outlet opening; means defining a plurality of chimneys between said face panels and comprising, a plurality of upright wood laths extending between the face panels, and means securing the laths to said face panels in spaced apart relation width-wise of the door; the distance between two adjacent laths not exceeding 150 mm; electric heating element means in said chimneys in a lower third of said door for heating air in said chimneys to cause flow from said inlet opening to said outlet opening; means for supplying electrical energy to said heating element means, and further comprising a sheet of thermal insulating material on each side of said heating element means and closely adjacent to inside surfaces of said face panels, each sheet extending substantially the height of the door, and being bowed inwardly between adjacent laths to space said sheets slightly from said inside surfaces of the face panels in the region of said chimneys.

5. A heated door according to claim 4 further comprising a metalized surface on that surface of said sheets which faces toward a face panel.

6. A heated door according to claim 4 further comprising a thin metal sheet between each sheet of insulating material and the interior surface of a face panel.

7. A heated door according to claim 4 wherein each sheet of insulating material is clamped between said laths and said face panels, said sheets have openings therein, and said means securing the laths to said face panels comprises, means bonding said laths to the face panels through said openings of said sheets.

8. A heated door according to claim 1 wherein said heating element means comprise a resistance heater composed of woven conductor and insulating wires, said resistance heater heating to a temperature not exceeding about 500° C.

9. A heated door according to claim 8 wherein said heating element means comprise a plurality of separate heating elements, one in each chimney, and means attaching said heating elements to said laths and comprising, an upright strip connected to a side of each lath.

10. A heated door according to claim 8 wherein said heating element means comprise a plurality of heating elements, one in each chimney, said laths each have grooves along opposite sides thereof, and side portions of said heating elements extend into said grooves.

11. A heated door according to claim 10 further comprising an electrically insulated channel member in each groove and between said laths and said heating elements.

12. A heated door according to claim 1 further comprising temperature sensing means between said face panels and below said heating element means, thermostat control means electrically connected to said electrical heating means for controlling energization of the electrical heating element means in response to said temperature sensing means, manual adjustment means connected to said thermostat control means and accessible from outside said door for adjusting the thermostat control means.

13. A heated door according to claim 12 further comprising aligned slots in said two face panels, said manual adjustment means comprising a control member extending through each of said slots.

14. A heated door according to claim 1, further comprising a safety cutout disposed against one of said face panels, and at a distance of less than 200 mm from said heating element means, said safety cutout being electrically connected to said heating element means for disconnecting the heating element means in the event of obstructed air flow through said air openings.

15. A heated door according to claim 1 wherein said means for supplying electrical energy to said heating element means comprises at least two conductors disposed below said fresh air intake and electrically connected to said heating element means.

* * * * *